(12) United States Patent
Mimran

(10) Patent No.: US 10,848,596 B2
(45) Date of Patent: Nov. 24, 2020

(54) METHODS AND SYSTEMS FOR DYNAMIC MATCHING AND COMMUNICATION BETWEEN SERVICE PROVIDERS AND SERVICE REQUESTERS

(71) Applicant: READYB, LLC, Woodland Hills, CA (US)

(72) Inventor: Idan Mimran, Woodland Hills, CA (US)

(73) Assignee: READYB, INC., Thousand Oaks, CA (US)

( * ) Notice: Subject to any disclaimer, the term of this patent is extended or adjusted under 35 U.S.C. 154(b) by 24 days.

(21) Appl. No.: 16/293,608

(22) Filed: Mar. 5, 2019

(65) Prior Publication Data

US 2019/0273807 A1 Sep. 5, 2019

Related U.S. Application Data

(60) Provisional application No. 62/638,804, filed on Mar. 5, 2018.

(51) Int. Cl.
| | |
|---|---|
| *G06F 15/16* | (2006.01) |
| *H04L 29/08* | (2006.01) |
| *H04L 12/24* | (2006.01) |
| *H04W 4/029* | (2018.01) |

(52) U.S. Cl.
CPC ........ *H04L 67/327* (2013.01); *H04L 41/5012* (2013.01); *H04L 67/1021* (2013.01); *H04L 67/16* (2013.01); *H04W 4/029* (2018.02)

(58) Field of Classification Search
USPC ........................................................ 709/219
See application file for complete search history.

(56) References Cited

U.S. PATENT DOCUMENTS

| | | | | |
|---|---|---|---|---|
| 10,036,642 | B2 * | 7/2018 | Ross | H04B 7/04 |
| 10,050,760 | B2 * | 8/2018 | Ross | H04W 4/029 |
| 10,180,332 | B2 * | 1/2019 | Yu | G01C 21/3438 |
| 10,215,574 | B2 * | 2/2019 | Cun | G06F 9/453 |
| 10,243,604 | B2 * | 3/2019 | Ross | H04B 1/3822 |
| 10,330,482 | B2 * | 6/2019 | Chen | G01S 19/13 |
| 2014/0164167 | A1 * | 6/2014 | Taylor | G06Q 30/0611 |
| | | | | 705/26.4 |

\* cited by examiner

*Primary Examiner* — Alicia Baturay
(74) *Attorney, Agent, or Firm* — Concept IP LLP; Pejman Yedidsion

(57) ABSTRACT

Methods, processes, and devices for dynamic service matching include collecting provider data from a plurality of providers, receiving a service request by a user, processing the service request based on the collected provider data, sending, via a network, the processed service request to at least one of the plurality of providers, receiving at least one service bid from the at least one of the plurality of providers wherein the at least one service bid includes service data, filtering the at least one service bid based on the service data, sending, via a network, the at least one filtered service bid to the user, receiving a selection input from the user, and establishing a direct communication channel between the user and the provider based on the received selection input.

11 Claims, 15 Drawing Sheets

METHODS AND SYSTEMS FOR DYNAMIC MATCHING AND COMMUNICATION BETWEEN SERVICE PROVIDERS AND SERVICE REQUESTERS

TECHNICAL FIELD OF ENDEAVOR

The invention relates to the field of dynamic matching and establishing communication channels, more particularly, dynamically matching service providers to service requesters via request and data filtering processing by using their computing devices in order to facilitate more efficient matching of services and communication between users.

BACKGROUND

The service industry in some areas accounts for over eighty percent of all employment. Traditionally, potential service customers could find local providers through directory listings such as phone books. Today, however, upwards of seventy percent of people do not open their phone books if they even still receive one. Searching for service providers today can be accomplished on the internet, which may include spending time searching, calling multiple providers to receive quotes, and researching business reputations in order to make a purchasing decision.

SUMMARY

Embodiments for methods, systems, and devices for dynamic service matching and communication may include: collecting provider data from a plurality of provider devices, receiving a service request from a user device, processing the service request based on the collected provider data, sending, via a network, the processed service request to at least one of the plurality of providers, receiving at least one service bid from the at least one of the plurality of providers where the at the least one service bid includes service data, filtering the at least one service bid based on the service data, sending, via a network, the at least one filtered service bid to the user, receiving a selection input from the user, and establishing a direct communication channel between the user and the provider based on the received selection input. Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF DRAWINGS

The various embodiments of the present dynamic matching and communication of service providers and service requests now will be discussed in detail with an emphasis on highlighting the advantageous features. These embodiments depict the novel and non-obvious dynamic matching and communication of service providers and service requesters shown in the accompanying drawings, which are for illustrative purposes only. These drawings include the following figures, in which like numerals indicate like parts.

DETAILED DESCRIPTION

Figure 1:
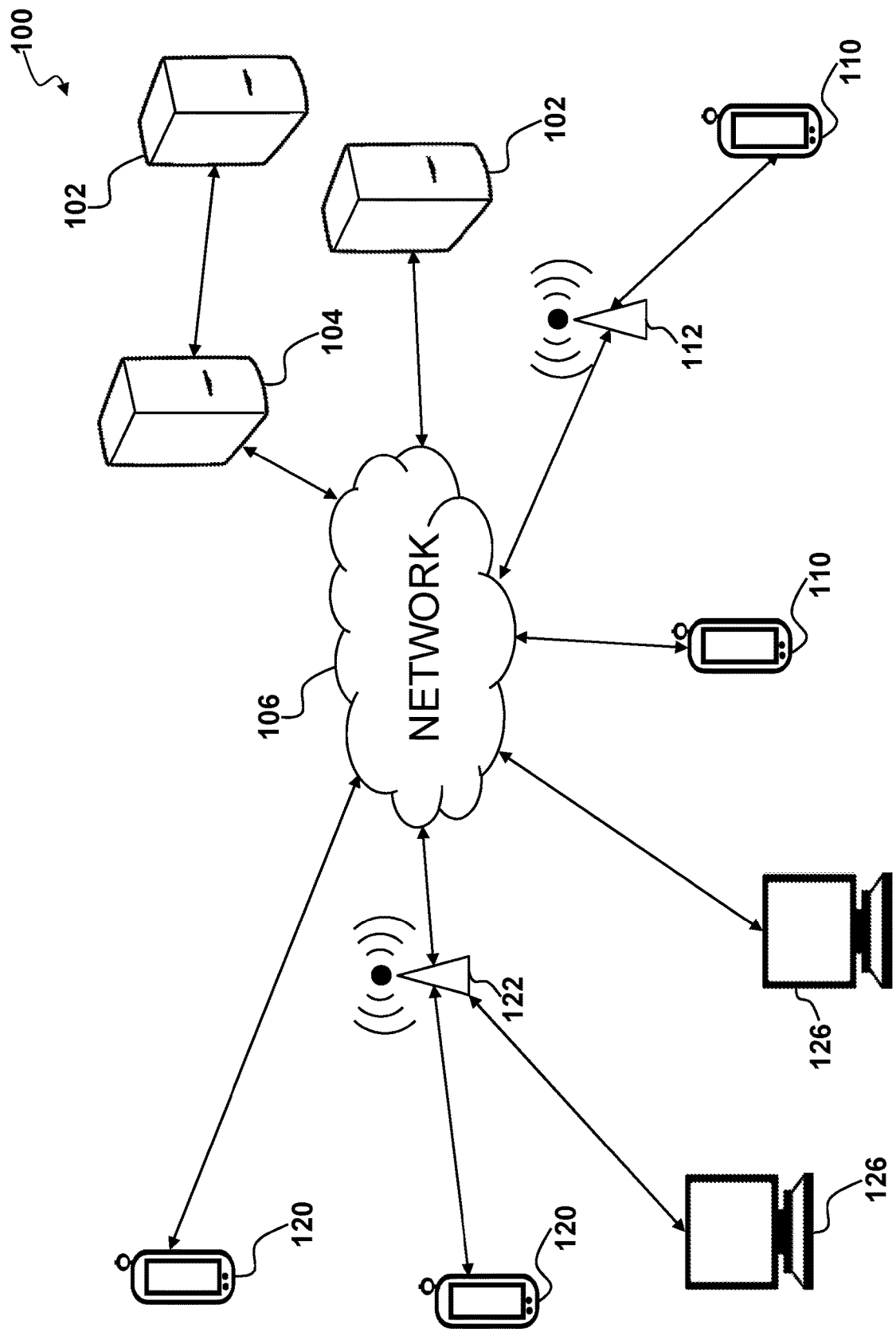
FIG. 1 depicts a network diagram of a dynamic matching and communication system for service providers and users in accordance with an embodiment of the invention.

In the present application, the current embodiments describe methods and systems for matching service providers with service requesters and establishing direct communication channels between the parties. In accordance with various embodiments of the invention, the systems and methods described improve the efficiency of finding proper service providers who can sufficiently address the user's service needs in a more efficient manner than current methods.

Current methods of locating service providers can be time-intensive and non-comprehensive. Internet search options are often filtered and may lack many of the filters necessary for certain, specific service needs. This can lead to potential service users having to select a service provider from a limited or unqualified selection. Furthermore, some current service provider search options fail to account for a service provider's location or availability, leading to time spent researching service providers who cannot be a match for the user.

The dynamic matching and communication of service providers and users in accordance with aspects of the present embodiments improves both a potential user's search for a provider, and a provider's search for new customers. Searches can be done through one centralized system that allows specialized options and filters to best match up service providers and users in order to establish direct communication between both parties. The centralized system may also regulate transactions and/or provide added security features to both parties.

Dynamic matching in accordance with many embodiments of the system may be accomplished and enhanced through the use of a centralized server. In many embodiments, the centralized server comprises data regarding numerous service providers. This data may be stored in a centralized provider database or in certain embodiments stored and accessed remotely through a cloud-based service. The provider database may be accessed through a network such as the Internet allowing for both service providers and service users to connect. In many embodiments, the centralized server along with user interfaces on a mobile device may provide a distinct graphical user interface for both service providers and service users. In a number of embodiments, service providers actively enter service data into the provider database. In certain embodiments, service provider data is created by searching and/or scraping external web sites or databases.

Service providers and users may access the centralized server in numerous ways. In many embodiments, both service providers and users utilize a software application executing on a portable computing device having a processor and addressable memory. The computing device may transmit data, and associated information to the centralized server via, for example, wireless WiFi®, wireless local area network (WLAN), or other wireless networks with broadcast methods such as Long Term Evolution (LTE), Bluetooth, and/or any other hardware or software radio broadcast methods. The centralized server may connect and work with any such devices that may use LTE or WLAN, for example, mobile phones, specifically smartphones, personal computers, video game consoles, tablets, televisions, and/or digital cameras, to connect to a network resource such as the Internet via wired or wireless communication.

Communication between the user, service provider, and centralized server may be accomplished in a number of ways. In one embodiment, the data communication between the centralized server, and the mobile computing devices may be via, for example, a User Datagram Protocol (UDP) which is a transport layer protocol defined for use with the IP network layer protocol. In many embodiments, a push data mechanism may be implemented via TCP/IP protocols and the line tracking time updates may be sent in real-time. Each mobile device may comprise an embedded web application server that may allow executable applications or scripts, that may be available in versions for different platforms and are to be executed on the mobile device. Applications may be developed to support various mobile devices and their respective operating systems such as: iOS, Android, and Windows.

In a number of embodiments, a user will send a request for a service to the centralized server when a service is desired. In a further number of embodiments, the user will be prompted to enter service request data that may include (but is not limited to) service type, price range, location, service time, and/or provider rating desired. By way of example, a user could enter information that indicates they are looking for a service provider who can fix a broken refrigerator and then be prompted for a location, desired time of service, and/or what problems the refrigerator is experiencing. In further embodiments, this received user data is converted into a service request object and sent to the centralized server for processing.

In a variety of embodiments, the centralized server receives the service request object and utilizes the provider database for processing of the data. In certain embodiments, the service request data is parsed and processed to best match potential providers to the desired service requested at real-time or near real-time. The matching may be based on certain factors including, but not limited to, provider type, provider location, provider business hours, provider rating, and/or past average prices of similar service requests. Based on the processed data, multiple providers may be contacted who may potentially provide the service and where the requests may be sent in parallel. In a number of embodiments, the providers are sent a service request in the form of a service proposal or bid request.

Providers receive service bid requests for service from the centralized server. In many embodiments, these requests may come in the form of a push notification on a mobile computing device indicating a need for the provider's attention. In certain embodiments, providers may evaluate the service bid request and respond with a variety of data including, but not limited to, availability to provide the service, potential time of service, a cost estimate of the service, and/or current location. Providers are under no obligation to respond to these service bid requests. In some embodiments, providers may be incentivized to provide service bid requests by offering incentives including, but not limited to, an increased provider rating, priority ranking of service bids, and/or preferential placement in service bid listings. The service bid request may be sent back to the centralized server.

The centralized server may receive and process the one or more received bids. In a number of embodiments, the centralized server may add the data contained in the service bid request into the provider database for future provider metric and matching processing. In certain embodiments, the centralized server may process a plurality of service bid requests based on the data entered by the service providers in the bid request. In further embodiments, the processing may include ranking the service bids by a number of factors including, but not limited to, bid request priorities, location, last time of check-in, and service bid price. Filtered service bids may then be sent to the user.

The user may choose a service provider based on the received filtered service bids. In a number of embodiments, the received filtered bids are presented to the user in a service bid listing that provides information about each of the service bids placed by the service providers. In further embodiments, the service bid listing may include information including, but not limited to, service bid price, location of the service provider, historical service provider ranking, service provider reviews, and/or number of previous service bids accepted. In certain embodiments, the user may be presented with two options to choose from. The user may enter a choice for an accepted service bid in the service bid listing. In still further embodiments, the user may list a ranking of preferred service bids. In certain embodiments, the service bid listing may be updated in real-time or near real-time to reflect updates in any aspect of the bidding process including, but not limited to, service provider availability, pricing based on demand, and/or estimated arrival times.

User bid selections are sent to the centralized server. In many embodiments, the centralized server may verify the accepted service bid through a number of methods including, but not limited to, verifying the provider is still checked into the mobile computing device application, verifying the location of the service provider in relation to the user requesting the service, and/or verifying that direct communication between the user and service provider can be established. In certain embodiments, the verification may be done through the use of Global Positioning System (GPS) signals verifying that either the service provider or the user is still within a pre-defined geographical boundary. In additional embodiments, verification may be done through the use of keep-alive signals being sent to the mobile computing device and/or application. The centralized server may establish a direct communication channel between the user and the service provider in the accepted service bid. In a number of embodiments, direct communication may be accomplished by providing a phone number and a generated unique ID to the user and/or prompting the mobile computing device to call the service provider in the accepted service bid without further input by the user. In further embodiments, the centralized server facilitates the direct communication by establishing a voice channel between the user and the centralized server and the service provider in the accepted service bid and the centralized server, and overlaying the communication channels of the user and the service provider to establish direct communication between the user and service provider. In one embodiment, this may be established via a Voice over IP channel.

In certain embodiments, the user and service provider may contact the centralized server after the service has been provided to enter post-service data relating to the service provided. This information may include, but is not limited to, user satisfaction with the service provided and the service provider, final cost of the service, provider feedback on the user, user feedback on the service provided, and/or time elapsed from direct communication established until the service was provided and completed. In further embodiments, this post-service data can be utilized in future requests from the same or other users and providers.

At all points of the dynamic matching process, the system may implement a time-out or check-in system. In a number of embodiments, service providers and users may be required to have a dynamic matching application open and running to complete the dynamic matching process. In certain embodiments, service providers may not have to be running the dynamic matching application until a push notification signifies a new service bid request has come in which may then require the service provider to be logged into the dynamic matching application. In certain embodiments, a keep-alive signal may be sent to the service provider that may be responded to in order to avoid being removed from the dynamic matching process. In other embodiments, the client may send keep-alive messages without being prompted. In additional embodiments, if either the user or service provider fail to respond to the next step of the dynamic matching process within a pre-determined amount of time, the dynamic matching process may end and have to be restarted from an earlier step. In further embodiments, service providers may add data that indicates the duration their service bids will be acceptable which can adjust the amount of time needed for a user response before a time-out occurs. Similarly, a service requester may specify a duration of time in what they expect or require the bid/service to be received or performed, thereby adjusting the amount of time needed for a service provider to respond before a time-out occurs.

A dynamic matching and communication system 100 for service providers and users in accordance with an embodiment of the invention is illustrated in FIG. 1. The dynamic matching and communication system 100 comprises a centralized server 102 that is connected to a network 106. In some embodiments, there may be more than one centralized server 102, which may be connected to a cloud-based server 104 that is itself connected to the network 106. In certain embodiments, the cloud-based servers 104 may be administered by a third party. In many embodiments, the dynamic matching and communication system 100 comprises service provider mobile computing devices 110 connected to the network 106. Additionally, certain embodiments may have provider devices 110 connected to a wireless network access point 112, which is itself connected to the network 106. Additionally, service users can access the centralized servers 102 through a variety of methods. In a number of embodiments, the user may connect to the network 106 through mobile computing devices 120 or desktop computers 126. These mobile computing devices 120 and desktop computers 126 may be connected directly to the network 106 or through a wireless network access point 122, which is itself connected to the network 106.

While a variety of dynamic matching systems for service providers and users are described above with reference to FIG. 1, the specific components utilized within a dynamic matching system and the manner in which the connections between the centralized server, the user's devices, and the service provider's devices are largely dependent upon the requirements of specific applications. For example, in certain embodiments, users may connect to the network with a variety of devices including cell phones, laptop computers, tablets, desktop computers, smart-home interfaces, or through appliances that are in need of servicing including (but not limited to) televisions, and refrigerators. Those skilled in the art will appreciate the numerous methods of communicating over networks including the Internet, which can be accessed through cellular networks, local area networks, or satellite services. Processes for dynamically matching service users to service providers are discussed below.

At a high level, processes for dynamically matching service users and service providers involve users sending a request for service to a centralized server that comprises provider information, requesting service bids from providers that may provide the requested service, the user selecting one of the service bids, and establishing a direct communication channel between the users and service providers. The time window for this process may vary depending on the type of service requested. Additionally, in some embodiments, the involvement of the centralized server may vary depending on the type of service requested or the data that needs to be collected. A series of stages illustrating a system for dynamically matching users and service providers in accordance with an embodiment of the invention is shown in FIGS. 2A-2E.

Figure 2A:
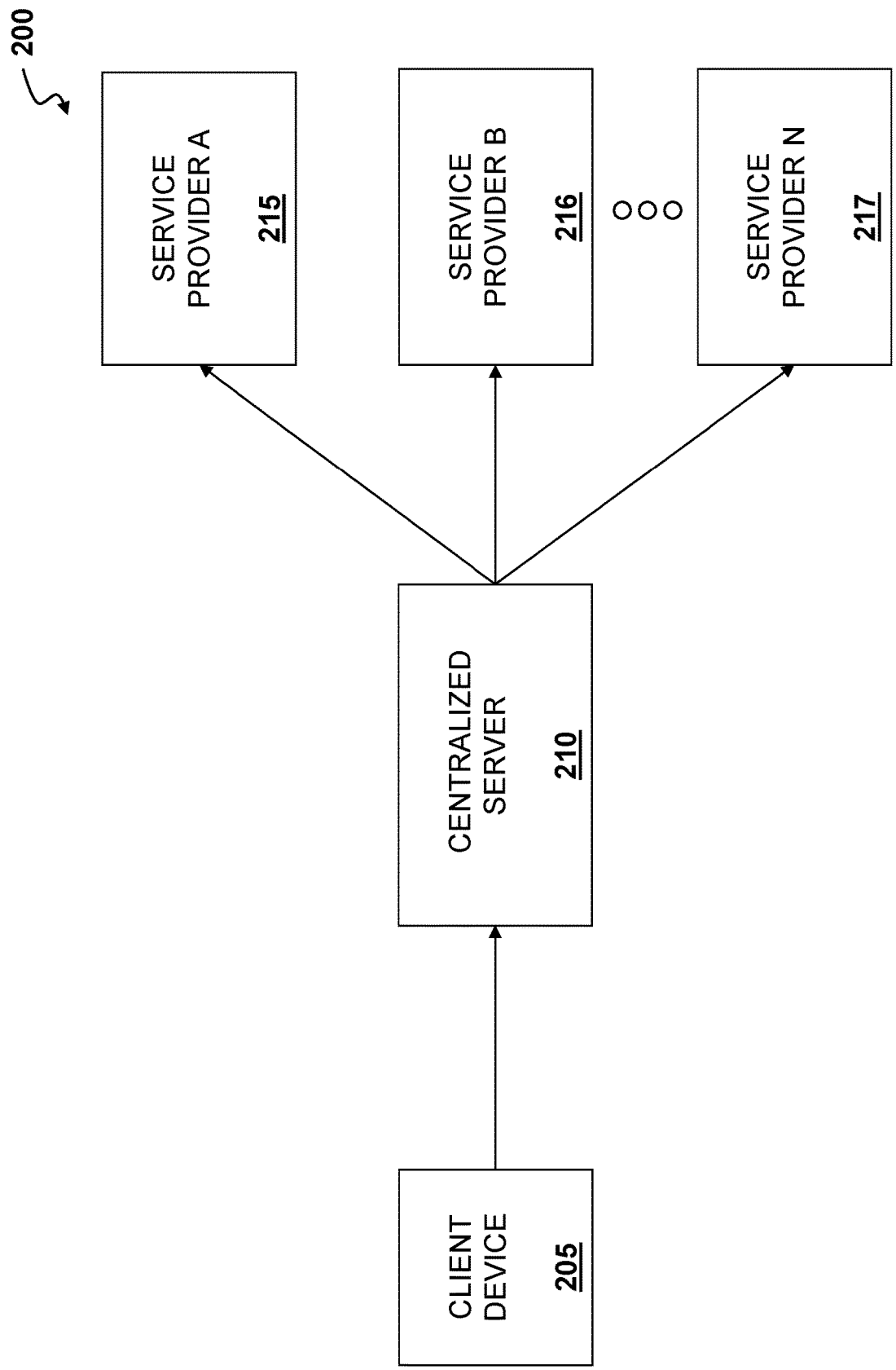
FIG. 2A is a functional block diagram illustrating a process for requesting a service in accordance with an embodiment of the invention.

FIG. 2A depicts the stage of requesting a service in accordance with an embodiment of the invention. The dynamic matching and communication system 200 may comprise a client device 205 connected to a centralized server 210. The client device 205 may transmit a request for a service to the centralized server 210. In many embodiments, the service request comprises data that may classify the type of service requested. In a number of embodiments, the centralized server 210 comprises data related to potential providers that was acquired prior to the service request being transmitted. In further embodiments, the centralized server may search and request provider data in response to a service request being made. In still further embodiments, the service request may contain provider data scrapped from a local network connection provided by the client device 205. In numerous embodiments, the centralized server 210 processes the service request data sent by the client device 205 in order to determine potential service providers to request service bids from. That is, the centralized server 210 will send notifications out to numerous service providers 215, 216, 217. In certain embodiments, data received by service provider A 215 will be different from data received by service provider B 216 or service provider N 217 due to factors including, but not limited to, service provider check-in status, service provider location, and/or historical service provider response times. Once service bid requests have been received by service providers 215, 216, 217, service bids may be made and returned, as explained further herein.

Figure 2B:
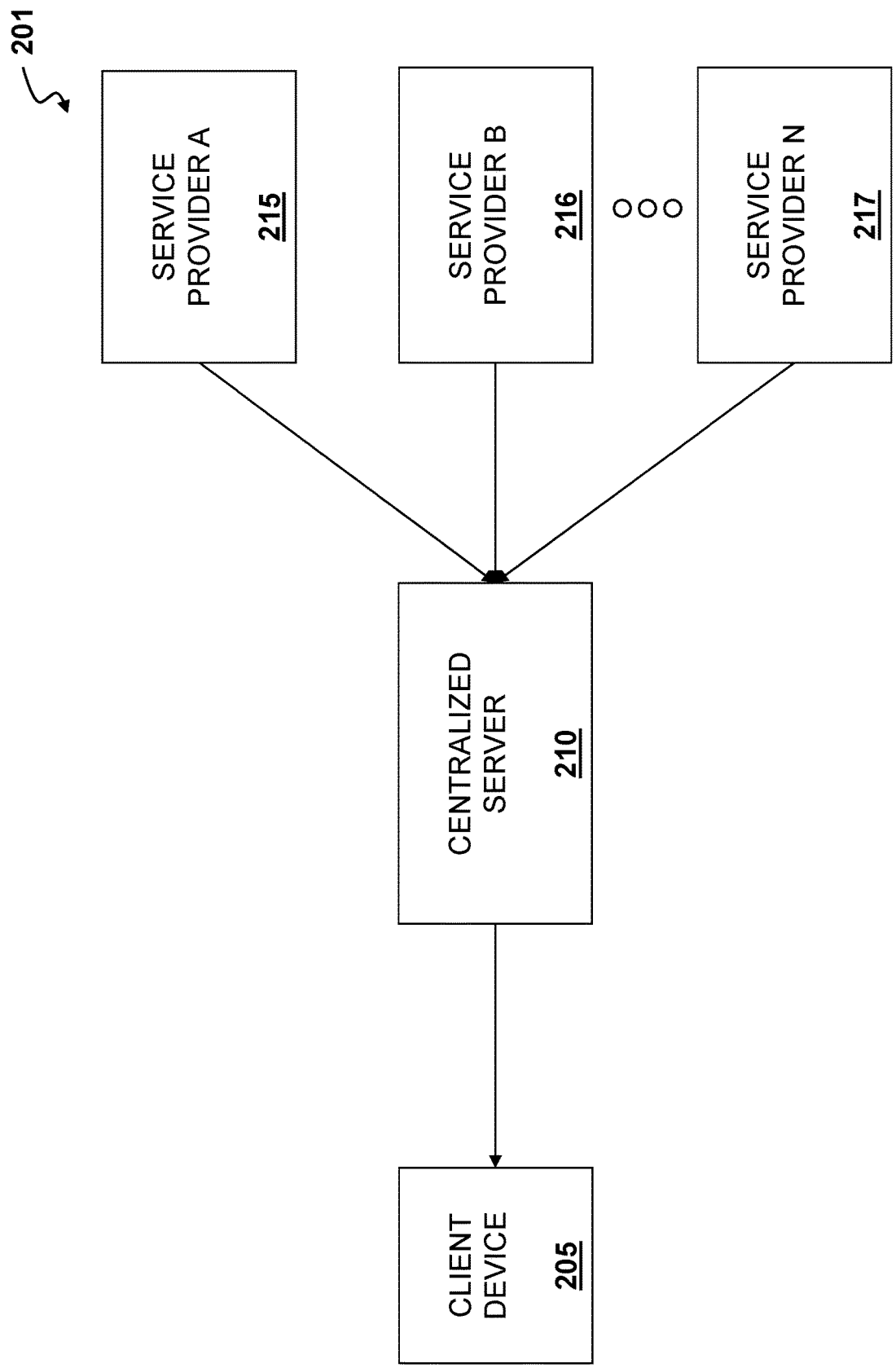
FIG. 2B is a functional block diagram illustrating a process for receiving service bids in accordance with an embodiment of the invention.

FIG. 2B depicts the stage of responding to service bid requests with service bids in accordance with an embodiment of the invention. The dynamic matching and communication system 201 comprises a series of service providers A 215, B 216, and N 217 connected to a centralized server 210. In response to a request for a service bid, each service provider 215, 216, 217 responds with a service bid transmitted to the centralized server 210. In many embodiments, the service bid includes information including, but not limited to, service price estimate, service time to completion estimate, notes from the service provider regarding the specific user service request, and/or alternatives to the requested service. In certain embodiments, a service provider can respond by declining a service bid request with data that can indicate the reason for denial. Once service bids (or service bid request denials) are received by the centralized server 210, service bid data is sent to the client device 205. In a number of embodiments, the centralized server 210 processes the received service bids including, but not limited to, ranking the service bids based on criteria from the centralized server 210 and/or the client device 205, eliminating service bids that do not conform with predetermined filters, supplementing bid requests with other provider data. The supplemented provider data can include, but is not limited to, historical provider ratings, provider reviews, historical provider service completion times, and/or price ranges from historical service requests from of a similar nature. In certain embodiments, the centralized server 210 may limit the transmission of service bid data to the client device 205 to a smaller number of service providers than all the available service providers, for example, only two service providers. Transmitted service bids are presented to the user on the client device 205, which is discussed below.

Figure 2C:
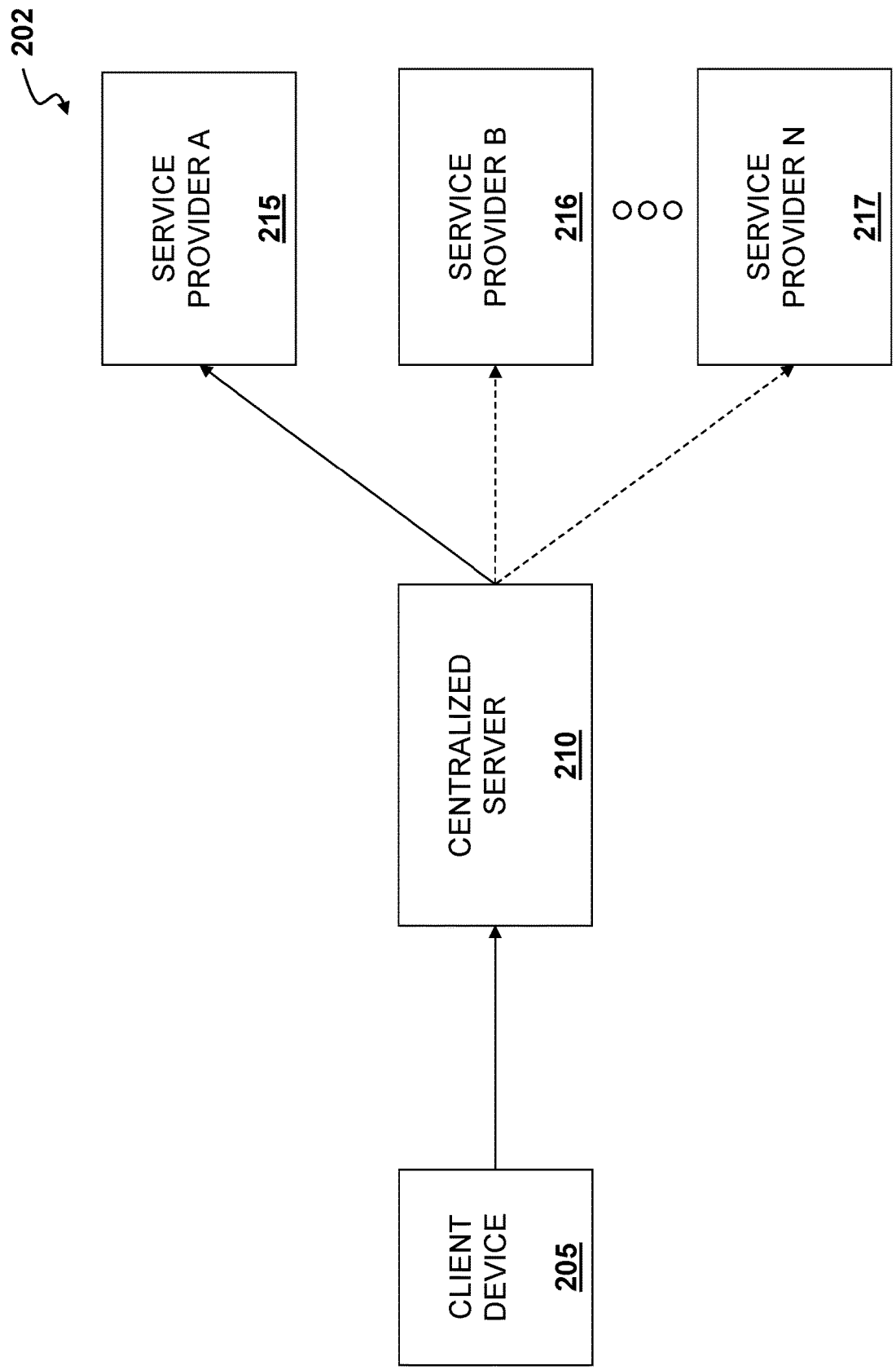
FIG. 2C is a functional block diagram illustrating a process for accepting service bids in accordance with an embodiment of the invention.

FIG. 2C depicts the stage of accepting service bids in accordance with an embodiment of the invention. The dynamic matching and communication system 202 comprises a client device 205 that has received service bid data from a centralized server 210. In some embodiments, the service bid data is presented to the user on the client device 205 as a list of providers. In further embodiments, the presented service bids comprise information including, but not limited to, provider names, provider quoted prices, provider estimated time frames for service completion, provider notes for the specific service request, and/or provider ratings. The client device 205 can be equipped to receive input from the user indicating an acceptance of a service bid. In a number of embodiments, the accepted bid data is transmitted to the centralized server 210. By way of example, the accepted bid may have corresponded to the service bid submitted by service provider A 215. In certain embodiments, the centralized server 210 can transmit a bid acceptance message to the service provider. In other embodiments, the centralized server 210 may transmit a final service offer acceptance message to the service provider in order to verify the service provider can perform the service. In still further embodiments, the centralized server may transmit bid denials to service providers who did not have their bid accepted. In still yet further embodiments, the centralized server may not send out any data to service providers in response to receiving an accepted bid. In a number of embodiments, the accepted bid must be verified before direct communication can be established between the service user and provider. Verification of an accepted bid is discussed below.

Figure 2D:
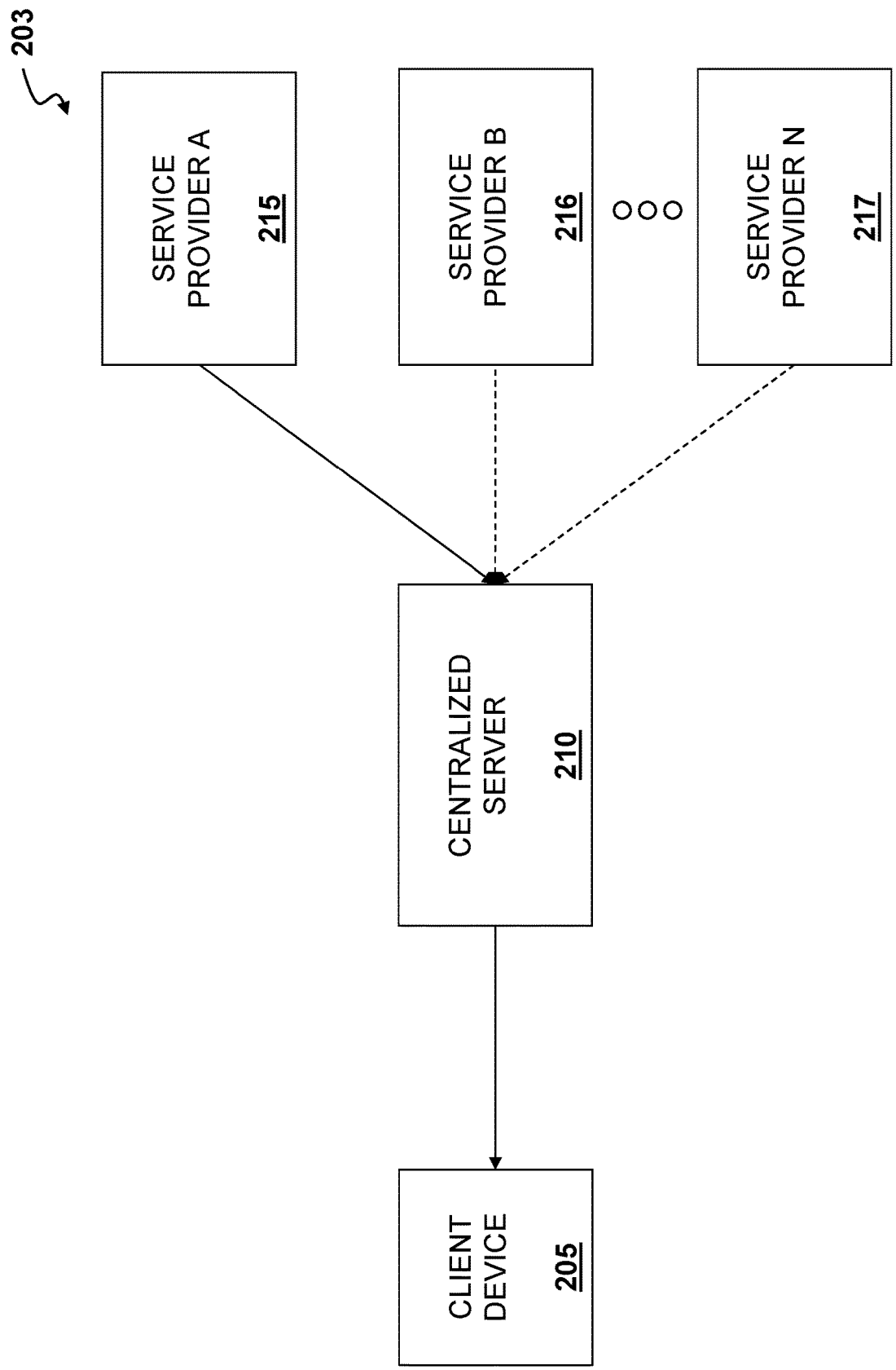
FIG. 2D is a functional block diagram illustrating a process for verifying accepted bids in accordance with an embodiment of the invention.

FIG. 2D depicts the stage of verifying accepted bids in accordance with an embodiment of the invention. The dynamic matching and communication system 203 comprises a centralized server 210 that receives data from service provider A 215. By way of example, service provider A 215 had a service bid request accepted by the user and may want to transmit data back to the centralized server 210 to verify acceptance of the bid. In many embodiments, the data that service providers send to the centralized server 210 in this stage may include, but is not limited to, location data, check-in data and/or service bid acceptance data. In a number of embodiments, the centralized server 210 may process the data provided by a service provider before establishing direct communication between the user and service provider. In certain embodiments, verification can be done in numerous ways including, but not limited to, comparing location information of the user and service provider, comparing the price requested by the user and the estimated service price provided by the service provider and/or comparing data in the provider database to data currently being provided by the service provider. In further embodiments, service providers who did not have an accepted bid can still provide data to the centralized server 210. By way of example, service provider N 217 can provide data to the centralized server 210 indicating that their service bid is still valid and can still be accepted if service provider A 215 is not verified to accept the bid, and service provider B 216 can provide verification data to the centralized server 210 that the declined bid could be amended to a different price. In still further embodiments, establishing direct communication between the user and service provider can be achieved after the verification process is completed. Establishing direct communication is discussed below.

Figure 2E:
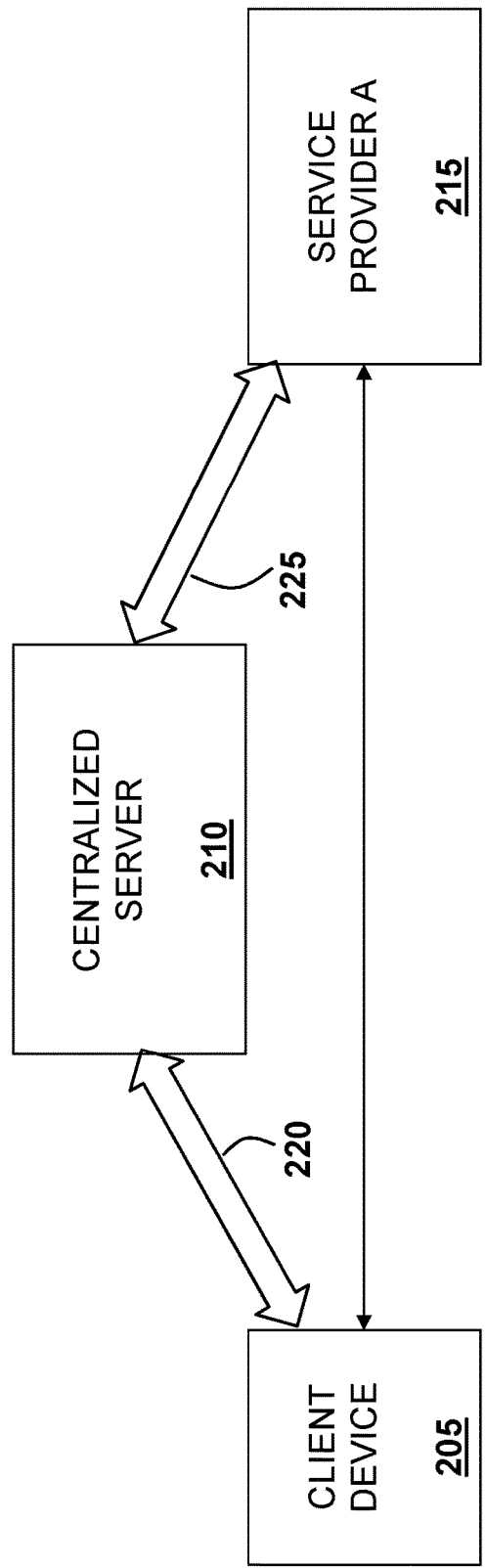
FIG. 2E is a functional block diagram illustrating a process for establishing direct communication in accordance with an embodiment of the invention.

FIG. 2E depicts the stage of establishing direct communication between the user and the service provider. In some embodiments, the dynamic matching and communication system 204 may connect the client device 205 with the service provider 215 without the need for a centralized server. In other embodiments, this connection may be achieved by way of a centralized server 210. In further embodiments, the method of direct communication achieved may be through a voice call. As one skilled in the art would appreciate, voice calls can be accomplished through a number of means including cellular networks, twisted pair telephone lines, voice over IP (VOIP), or other comparable means of achieving direct voice conversations. In still further embodiments, the direct communication could be through a digital text or email service. In other embodiments, the centralized server 210 may establish a connection directly between the client device 205 and service provider 215, where in yet other embodiments, the central server may overlay the communication channels between the client device 205 and the service provider 215 while handing off the data back and forth between them 220,225. In this embodiment, the centralized server may establish the direct communication channel via a unique ID generated and passed to the client device 205 and service provider 215. Once direct communication is established, the user and service provider can complete the requested service. In some embodiments, the centralized server 210 may use GPS location related data received from the client device 205 and a service provider 215 device to effect initiation of the communication channel.

While a variety of dynamic matching and communication systems for service providers and users are described above with reference to FIGS. 2A-E, the specific components utilized within a dynamic matching and communication system and the stages in which the direct communication is established are largely dependent upon the requirements of specific applications. For example, in certain embodiments, multiple users may bid on the same service that only a limited number of providers can supply or service providers may amend their bids in response to competing service bids from other service providers. The timing of signals between the user device, the centralized server, and the service provider is discussed below.

In one embodiment, a service requester may provide by uploading or transmitting digital media, e.g., images and/or videos, associated with their request. Based on the received digital media, the central server 320 may determine a series of identifiers or categories by processing said received digital media using, for example, image recognition services. That is, an image recognition service or other artificial intelligence—via an application program interface (API)—may be used to retrieve probable keywords for the subject matter in the digital media to associate a set of identifiers or categories to the request. Further, in some embodiments, user generated or provided text or image tagging may be used to verify the accuracy of set of identifiers or categories from the image recognition service.

In some embodiments, the central server may as part of the filtering of the bids, validate the received bids from the service providers, before sending them to the service requester by using the determined set of identifiers or categories and previously recorded bids in similar geographic areas. Hence, the filtered bids may be provided to the service requester with a high degree of confidence that the service provider is not charging higher than usual prices for such similar services. In some such embodiments, the service requester may provide a range for their budget so that the central server may further filter the bids before they are provided to the service requester.

As disclosed, in the embodiments where methods, such as, keep-alive signals, may be implemented to ensure service providers are still active, the central server may further determine whether a service provider qualifies to provide the service by tracking the location of the service provider (via their computing device, such as a mobile phone). In some embodiments, the central server may do this via determining whether the service providers are within a radius having a predefined proximity to the service requester. That is, the central server may determine that a service provider cannot reach the location of the service requester by a requested time and therefore, as part of the filtering process, not include their bid—or even not send the request to them. In one example, the central server may take into account surrounding conditions, such as, weather, traffic, etc. to determine whether a service provider can meet the requirements set forth by the service requester, as part of the bid filtering process.

In some embodiments of the present system, the central server may provide a payment processing method using at least one of: the originally recorded bid amount, the GPS location of the service provider, the location specified by the service requester, and/or GPS location of the service requester. In this embodiment, the central server may compare the GPS location of the service provider with one of either the location specified by the service requester or GPS location of the service requester, to ensure that the service provider actually showed up to perform the job and that facilitating the payment is warranted. In one alternate embodiment, the central server may also keep track of the time the service provider spends at the service requester job and compare the time spent on the job with previously recorded times on similar jobs to ensure that the transaction is valid and facilitating the payment is warranted. Therefore, in addition to the verification and confirmation by the central server that the transaction was completed successfully, the payment is sent to the service provider (by the central server) upon both service provider and service requester transmitting a confirmation signal to the central server that the job has been successfully completed.

In one aspect of the presently disclosed embodiments, only service providers and service requesters who have either performed a service or received a service may be allowed to provide or submit a review or evaluation on the other party. That is, any fraudulent or baseless review that may come from a third party may not be accepted, ensuring that any comments received is from real parties involved in the transaction. Accordingly, the integrity of the review process is maintained by providing a closed system of reviews giving the central server control over which users have authority to provide a valuation, review, or assessment of the job a service provider performed. Additionally, the central server may have control over the process to ensure only authorized service providers who actually performed the service are allowed to submit a valuation, review, or assessment of the service requester and, for example, how easy it may have been to work with them.

In one embodiment, the central server may in addition, use the GPS location of both the service provider and the service requester to perform a validation check. That is, if the GPS locations of both parties doesn't reflect them being at the same place at the same time, then they most likely did not interact and therefore, a review provided by either one is not as accurate of effective. Accordingly, the central server may tag the valuation, review, or assessment as needing further verification before being published for public access. In one embodiment, the further verification may be the central server sending a request to both parties to approve and/or verify that the service did indeed occur and that the review written by the other side is reflective of the actually performed service.

Figure 3:
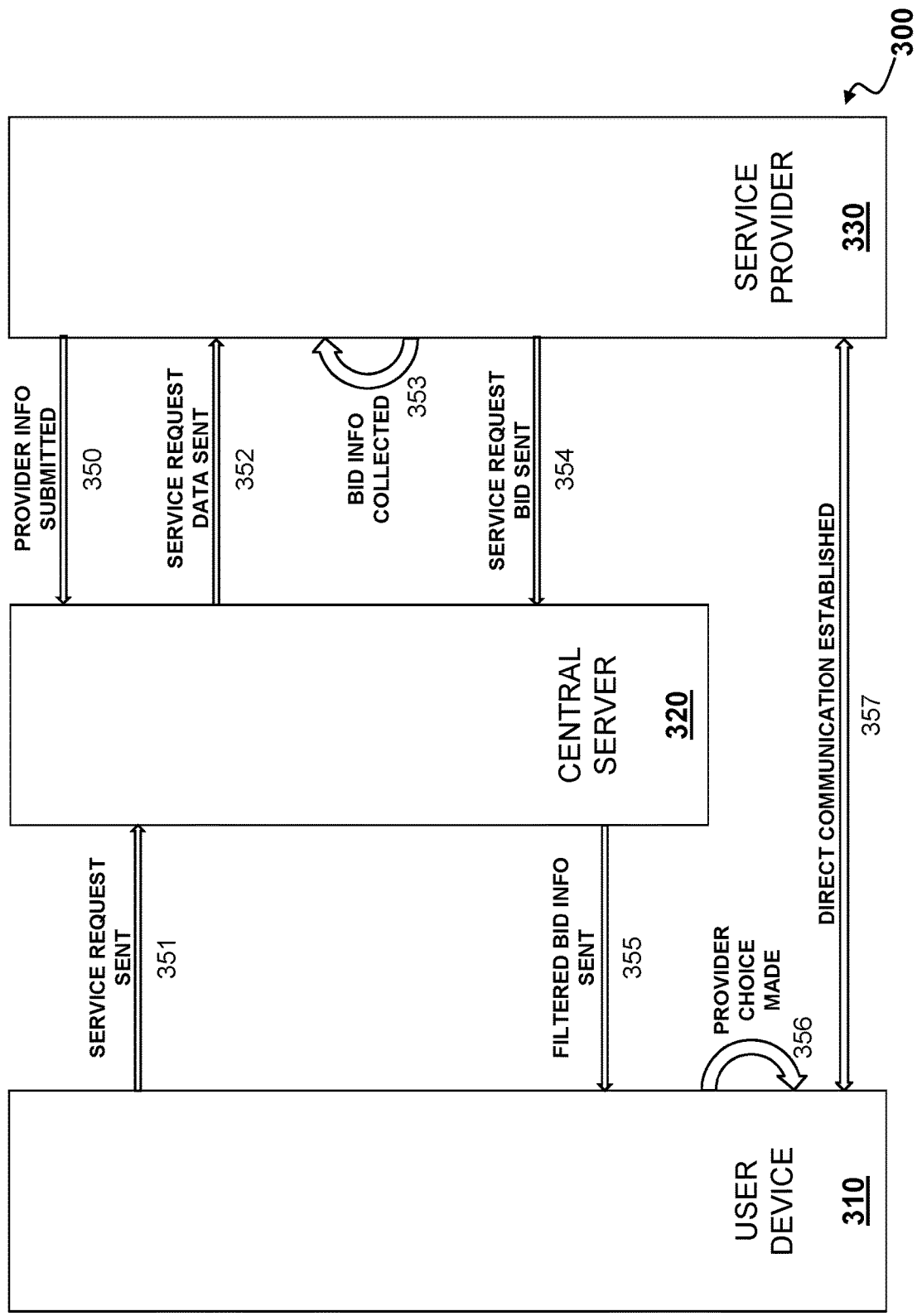
FIG. 3 illustrates signal timings for a dynamic matching and communication system for service providers and users in accordance with an embodiment of the invention.

Connecting service providers and users may require the transmission of multiple signals back and forth between the user device and the service provider with the centralized server acting as an intermediary for much of the process. FIG. 3 illustrates an embodiment of the signal timing process for dynamically matching service provider and users in accordance with an embodiment of the invention. The dynamic matching and communication system 300 comprises a user device 310, a centralized server 320, and a service provider 330. In many embodiments, the centralized server 320 will require service provider information to be submitted (350) before service requests may be accepted. Service requests may be sent (351) to the central server 320 from a user device 310. Service request data may be sent (352) to the service provider 330 from the centralized server 320. In numerous embodiments, service bid info is collected (353) that may include service bid data to be transmitted to the centralized server 320. When service bid info has been collected (353), the service request bid may be sent (354) to the centralized server 320 from the service provider 330. In further embodiments, the centralized server 320 will then filter all received service request bids before sending (355) the filtered bid info to the user device 310. Once received, the user may make (356) a choice of providers from the received bids. In certain embodiments, the choice of provider may start the process of establishing (357) direct communication between the user device 310 and the service provider 330 without the need for verification. In other embodiments, the central server 320 may verify (not shown) the accepted provider choice made (356) before direct communication is established (357).

While a variety of dynamic matching signal timings are described above with reference to FIG. 3, the specific signals and timings between them within a dynamic matching system and the stages in which the direct communication is established are largely dependent upon the requirements of specific applications. For example, in certain embodiments, the centralized server may consist of multiple servers and/or co-exist with cloud-based applications from third parties. In these embodiments, additional signals between the servers would occur to facilitate the dynamic matching process. An example of a mobile computing device that can be utilized for both user devices and service provider devices is discussed below.

Figure 4:
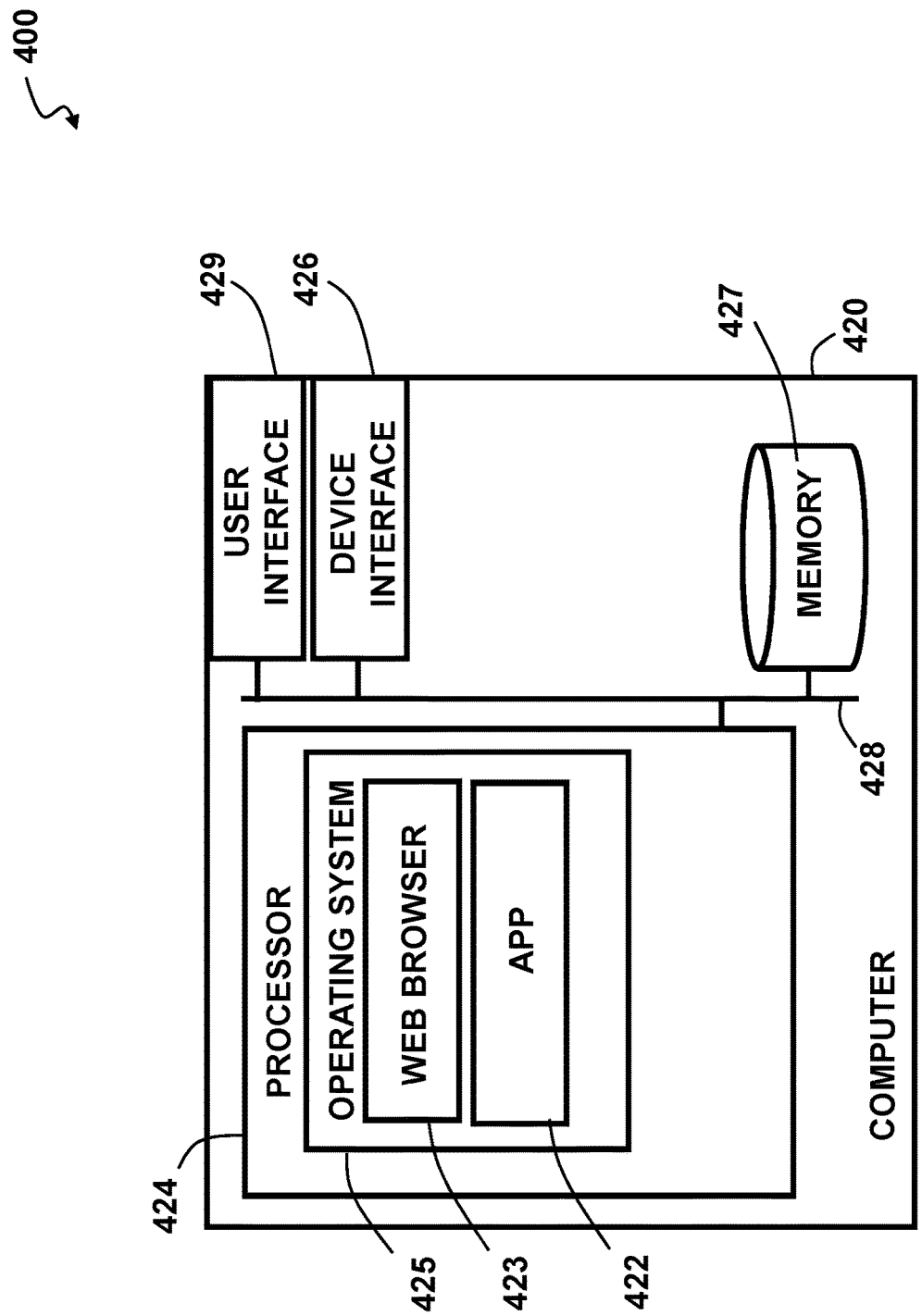
FIG. 4 illustrates a top level functional block diagram of a dynamic matching device.

FIG. 4 illustrates a top-level functional block diagram of a computing device 400 in accordance with an embodiment of the invention. The operating environment is shown as a computing device 420 comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may be, for example: flash memory, eprom, and/or a disk drive or other hard drive. These elements may be in communication with one another via a data bus 428. Via an operating system 425 such as one supporting a web browser 423 and applications 422, the processor 424 may be configured to execute steps of a process establishing a communication channel according to the exemplary embodiments described above.

Figure 5:
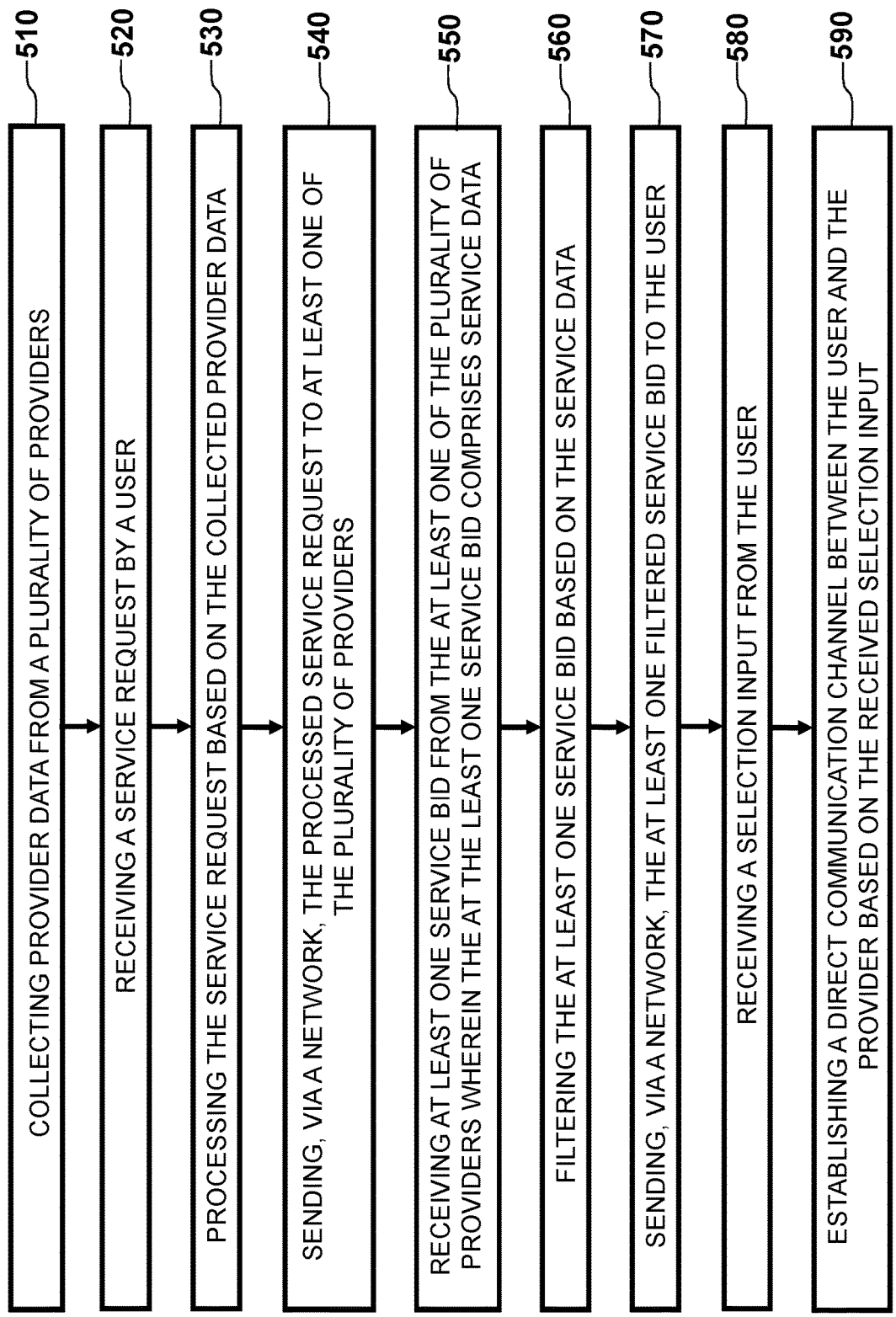
FIG. 5 is a flowchart depicting a process for dynamic matching and communication of service providers and users in accordance with an embodiment of the invention.

FIG. 5 is a flowchart of a process for dynamically matching service providers to service requests in accordance with an embodiment of the invention. The process depicted in the flowchart may be performed by the central server and includes the steps of: (a) collecting provider data from a plurality of providers (step 510); (b) receiving a service request by a user (step 520); (c) processing the service request based on the collected provider data (step 530); (d) sending, via a network, the processed service request to at least one of the plurality of providers (step 540); (e) receiving at least one service bid from the at least one of the plurality of providers wherein the at least one service bid comprises service data (step 550); (f) filtering the at least one service bid based on the service data (step 560); (g) sending, via a network, the at least one filtered service bid to the user (step 570); (h) receiving a selection input from the user (step 580); and (i) establishing a direct communication channel between the user and the provider based on the received selection input (step 590).

Figure 6:
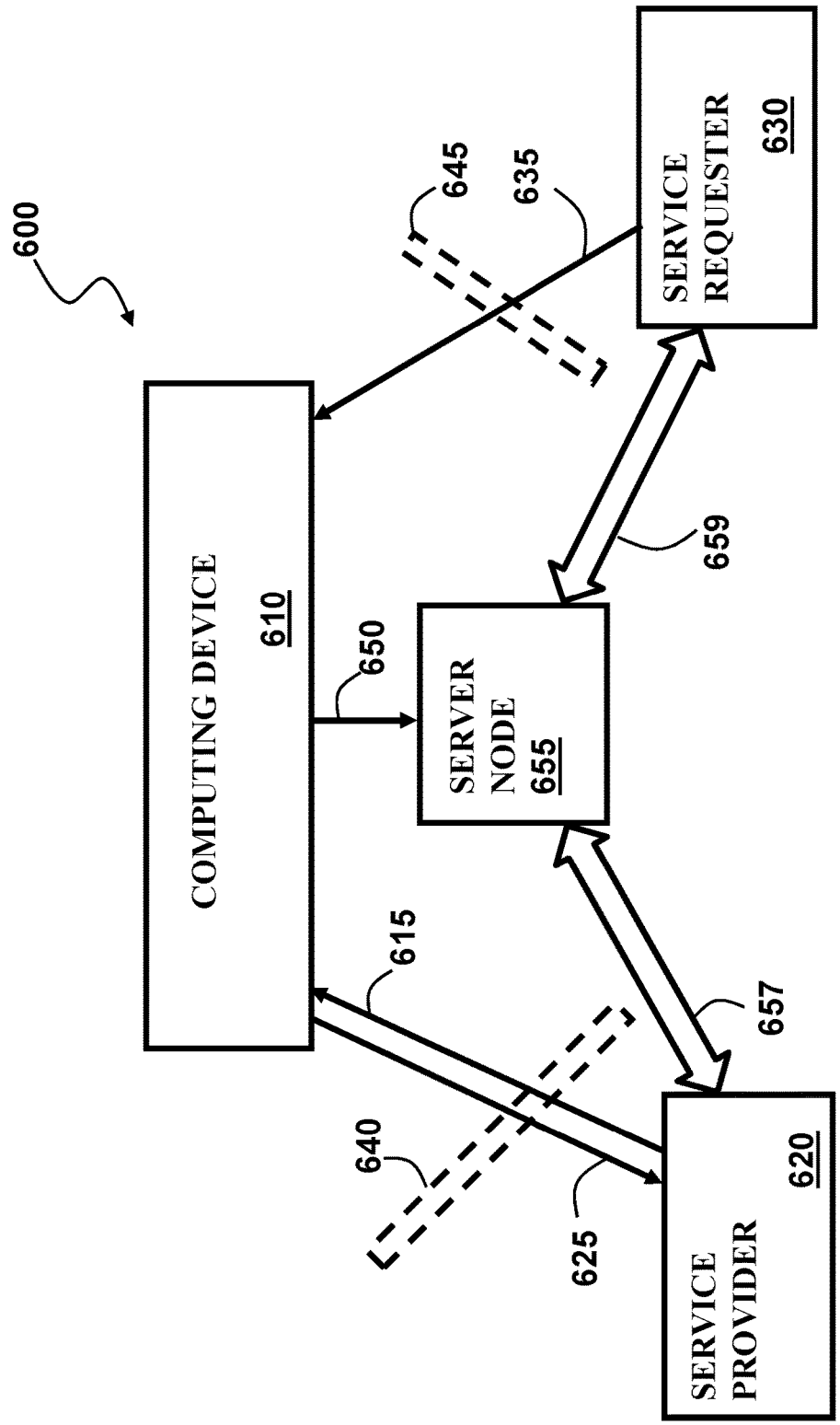
FIG. 6 depicts a computing system comprising a centralized server device, a service provider, a service requester, and a data exchange server.

FIG. 6 depicts a computing system 600 in accordance with an embodiment of the invention, comprising a central server, e.g., a computing device 610, a service provider node 620, a service requester node 630 at a client device, a server node, e.g., a data exchange server 655, and an optional first firewall 640 and optional second firewall 645. Optionally, the computing device 610 may be external to the service provider 620 and service requester 630 behind the optional set of one or more network firewalls 640, 645. In some embodiments, the data exchange server 655 may be used for data transmission, i.e., used to transfer data, via an established data channel, between the service provider 620 and the service requester 630. In some embodiments, the data exchange server 655 may be external to the service provider 620 and service requester 630 behind the optional set of one or more network firewalls 640, 645. In some embodiments, where the service requester 630 and service provider 620 may be protected by an optional set of one or more network firewalls 640, 645, the data exchange server 655 may be present to effect the exchanging of data between the devices. Optionally, once the computing device 610 has established a communication channel, the computing device 610 may provide, via transmitting to the data exchange server 655, a set of one or more attributes 650 to effect the transferring of data between the service provider 620 and the service requester 630. In one embodiment, the one or more attributes 650 may comprise a unique ID generated by the computing device 610 (or as previously referred to centralized server), where the generated unique ID may provide a way for the two devices to establish a direct communication channel, while still under the control of the computing device 610, which in accordance with the aspects of the different embodiments monitors, validates, and confirms the transactions. In an embodiment where the service provider 620 and service requester 630 are deployed within a network environment comprising a set of one or more optional network firewalls, the data exchange server 655 may act as a medium to transmit the messages, e.g., payload data, between the service provider 620 and service requester 630. Optionally, the data exchange server 655 may establish a unique set of data channels, e.g., a data channel 657 with the service provider 620 and a data channel 659 with the service requester 630. Optionally, when the data channels 657, 659 are established, the service provider 620 and service requester 630 may invoke data communication via the established data channels 657, 659.

In an embodiment depicted in FIG. 1C, where a data exchange server may effect a communication channel, via acting as a facilitator to facilitate communications between the service provider and service requester, the service provider and service requester may receive notification of pairing (e.g., accepted bid for a job) having been established. In some embodiments, the data exchange server may be reachable by both the service provider and service requester because the data exchange server may be outside the firewalls. Optionally, the data exchange server may act as a proxy for each device that may relay communication data between the two devices or alternatively, the data exchange server may operate like a pass-through server. In some embodiments, modification of the data being transmitted may be necessary where one device may send an HTTP request to the data exchange server that may be intended for the device it is currently paired with. Optionally, the data exchange server may modify the data, e.g., the HTTP header field, so that the request may be handled according to a set of rules established by the intended target device. Other network protocols may need modification and/or transformation of the data where host information may be included in the payload.

Figure 7:
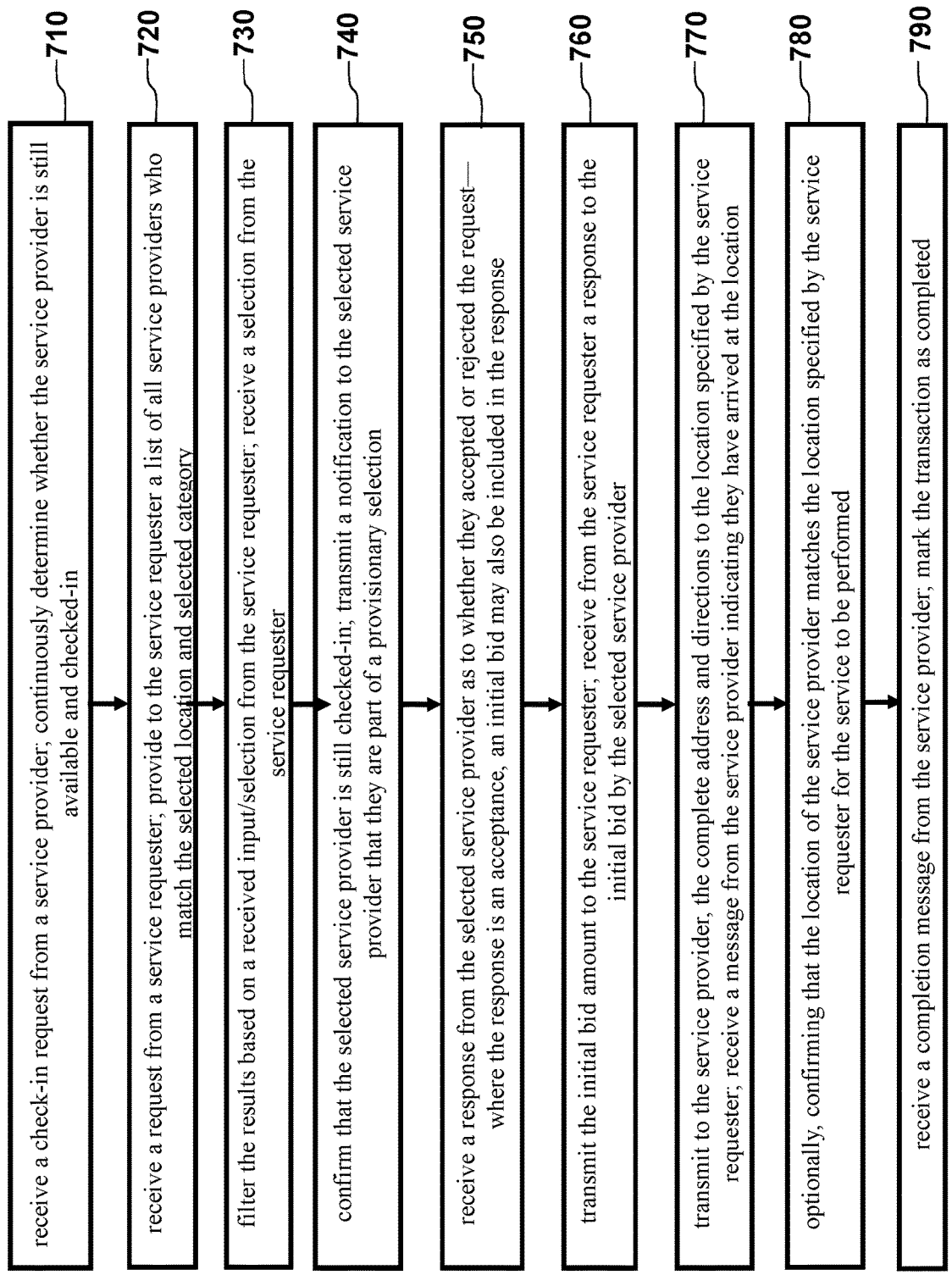
FIG. 7 is a flowchart depicting a process for dynamic matching and communication of service providers and service requesters in accordance with an embodiment of the invention.

FIG. 7 is a flowchart depicting a process for dynamic matching and communication of service providers and service requesters in accordance with an embodiment of the invention. In further reference to the method embodiments, the system for dynamic matching and establishing of communication channels between service providers and service requesters may include the steps of: receive a check-in request from a service provider; continuously determine whether the service provider is still available and checked-in; receive a request from a service requester, the request having the following information: selected location of service, selected category of service, and description, which may include photos, videos, etc.; provide to the service requester a list of all service providers who match the selected location and selected category; filter the results based on a received input/selection from the service requester, where the filtering of the results may be based on some additional criteria (for example, background check, whether insured, etc.); receive a selection from the service requester; confirm that the selected service provider is still checked-in, by for example, using keep-alive messages; transmit a notification to the selected service provider that they are part of a provisionary selection; receive a response from the selected service provider as to whether they accepted or rejected the request—in an embodiment where the response is an acceptance, an initial bid may also be included in the response; transmit the initial bid amount to the service requester; receive from the service requester a response to the initial bid by the selected service provider where the response may include an acceptance or a rejection; transmit to the service provider, the complete address and directions to the location specified by the service requester, based on receiving an acceptance response from the service requester; receive a message from the service provider indicating they have arrived at the location; optionally, confirming that the location of the service provider's computing device matches the location specified by the service requester for the service to be performed; receive a completion message from the service provider's computing device, where the completion message may include the signature of the service requester signing off on the service; and mark the transaction as completed.

In accordance with the aspects of the present embodiments, once a transaction is marked as completed, the service provider and service requester may then have the ability to provide a review of each other given their experience on the current transaction. In addition, some embodiments provide a temporary authorization of the service requester's payment method, for example, credit card, upon the initiation of the job and upon the transaction being marked as completed, charge the full agreed to amount to the service requester, ensuring that the service provider will be paid. In yet other embodiments, the service provider may take photos or videos of the final job and upload them to the server for confirmation and evidence in case of any future disputes or questions as to their service.

Figure 8:
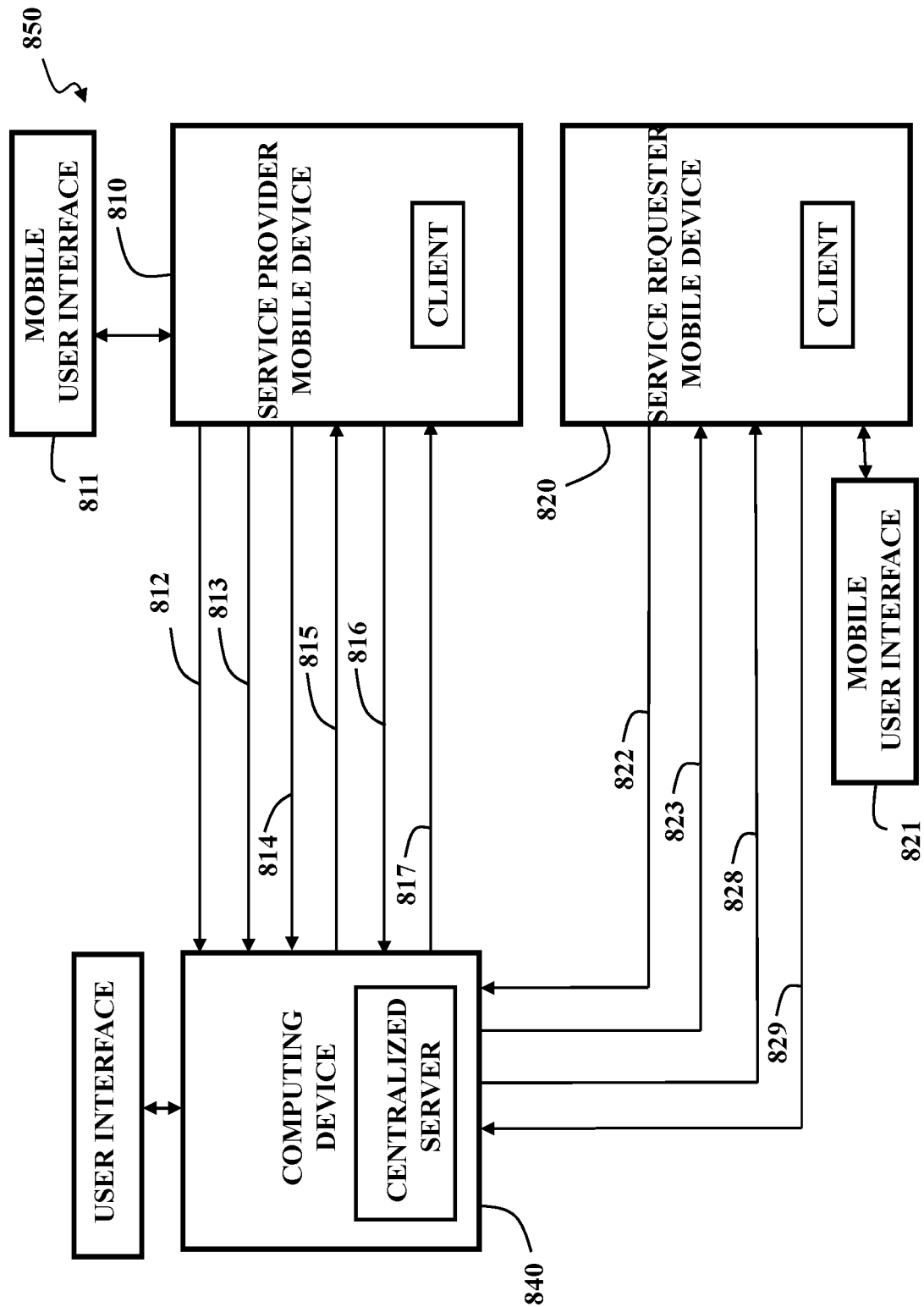
FIG. 8 depicts, in a functional block diagram, a communication sequence of message between a server device and multiple client devices.

FIG. 8 depicts, in a functional block diagram, a communication sequence of message between a server device and multiple client devices, e.g., mobile device of a service provider 510 and mobile device of a service requester 520. With further reference to FIG. 8, an embodiment of a client server system 850 is depicted as including a set of mobile devices as client nodes 810, 820 and a computing device as a server node 840, where, at each node, computer instructions are present to execute a set of applications. The client nodes 810,820 may comprise a user interface 811,821 (respectively) and may communicate with the server 840 component via a socket connection and send data, e.g., HTTP connection requests, to the server 840. In some embodiments, the client 810 may initiate the execution of an application via a command 812 that may include a message to check-in with the server and that the provider is available for providing services. In addition, the client 810 may provide continual transmission 813 of GPS location as a way to determine whether they are able to service an area within a specified radius. In one exemplary embodiment, the client 820 may transmit a command 822 to request service, where the request may include the location of service, what categories of services is needed, and/or provide description, photos, videos, etc. to aid with their request. The server 840 may then respond 823 by sending a list of all the service providers that fit the criteria and where the service requester may use a filter on the user interface 821 to narrow the list of service providers. The service requester may then select and respond (not shown) to the server 840 the selection, e.g., which provider has been selected. Embodiments may provide a way for the service providers to continually check-in with the server 840 via the client 810 sending a "keep-alive" message 814 at a predetermined time period so that the server may be able to update the list of service providers dynamically and on a real-time basis—other methods may be used to ensure continued availability of the service providers. That is, once a service provider is determined not to be available, they will not show up on the list of available or removed from the list—if they were already provided to the service requester.

In some embodiments, the service provider may receive a notification 815 that their service is needed/requested and they may then determine to accept or reject the request via the user interface 811. The notification of acceptance or rejection may then be transmitted 816 back to the server 840, where in some cases, a price or bid for the work being requested is included in the acceptance. The client 820 may then receive 828 the bid and other relevant information about the service requester that accepted the work and determine whether they want to continue with the process. If the service requesters, via the user interface 821, accepts the terms of the service, a notification is transmitted 829 to the server 840 with the acceptance and might also include additional details, for example, exact address, etc. of the job. The server may then transmit 817 that information to the service provider at the client 810 and inform them that the bid was accepted. Additionally, the transmitted 817 information may include the full address, along with directions to the location, and other relevant information for the service provider to go to and complete the job. In one example, the service provider may receive information about the type of pipe that was broken and be able to go to the department store and purchase the necessary parts before going to the jobsite. The server may also monitor the location of the service provider and make sure that they are on their way to the service requesters' location. Additionally, the server 840 may provide a method for the client nodes 810,820 to be in direct communication with each other, where the arrival time, etc. may be sent to the service requester directly from the service provider. Once the service provider arrives at the location, the provider will notify the server 840 and client 820 that they have arrived, either via the user interface and/or the GPS location. Upon completion of the work, the client 810 may receive a signature or acknowledgment from the service requester at the user interface 811 of the client 810 and transmit (not shown) that information to the server 840.

In some embodiments, the server may execute a set of one or more applications via an OS that may be running on the server. The application set may function in a way so as to have access to a set of resources on the device, e.g., access to memory and to operating system services, according to a set of rules which may be defined per application, per set of applications, or per server. The set of applications may be executed in an environment where the server is in communication with a plurality of client mobile devices. In some embodiments, the server OS may assign the URLs to each application and the client may direct the HTTP request to the URL that is associated with the application. Optionally, once an application has terminated, for example, after successful completion or terminal failure—the application may return a response to the client. In exemplary embodiments, the client may be external to the server and optionally, the client may be outside of a network firewall. In the exemplary embodiments where the client may be outside of a network firewall, an HTTP encapsulation method may be used to access the server.

In one embodiment, the communication channel may serve as a medium to pair multiple devices, e.g., resources or smart devices, with each other. Once paired, the devices may communicate and exchange data with each other. In some embodiments, a portable device may, for example, request a dynamically generated list of potential service providers. In another embodiment, a portable device may, for example, request to pair with a service provider in order to establish a direct channel of communication between service requester and service provider.

In one embodiment, the data communication between the devices may be via, for example, a User Datagram Protocol (UDP) which is a transport layer protocol defined for use with the IP network layer protocol. In one exemplary embodiment, a push data mechanism may be implemented via TCP/IP protocols and the line tracking time updates may be sent in real-time. Each mobile device may comprise an embedded web application server that may allow executable applications or scripts, e.g., application software, that may be available in versions for different platforms and are to be executed on the mobile device. Applications may be developed to support various mobile devices and their respective operating systems such as: iOS, Android, and Windows.

In many embodiments, both service providers and users utilize a software application on a portable computing device which can transmit data, and associated information to the centralized server via, for example, wireless WiFi®, wireless local area network (WLAN), or other wireless networks with broadcast methods such as Long Term Evolution (LTE), Bluetooth, and/or any other hardware or software radio broadcast methods. The centralized server may connect and work with any such devices that may use LTE or WLAN, for example, mobile phones, specifically smartphones, personal computers, video game consoles, tablets, televisions, and/or digital cameras, to connect to a network resource such as the Internet via wired or wireless communication.

The visual displays in the figures are generated by modules in local applications on computing devices and/or on the system/platform, and displayed on electronic displays of computing devices for user interaction and form graphical user interface for interaction with the system/platform disclosed herein.

Figure 9:
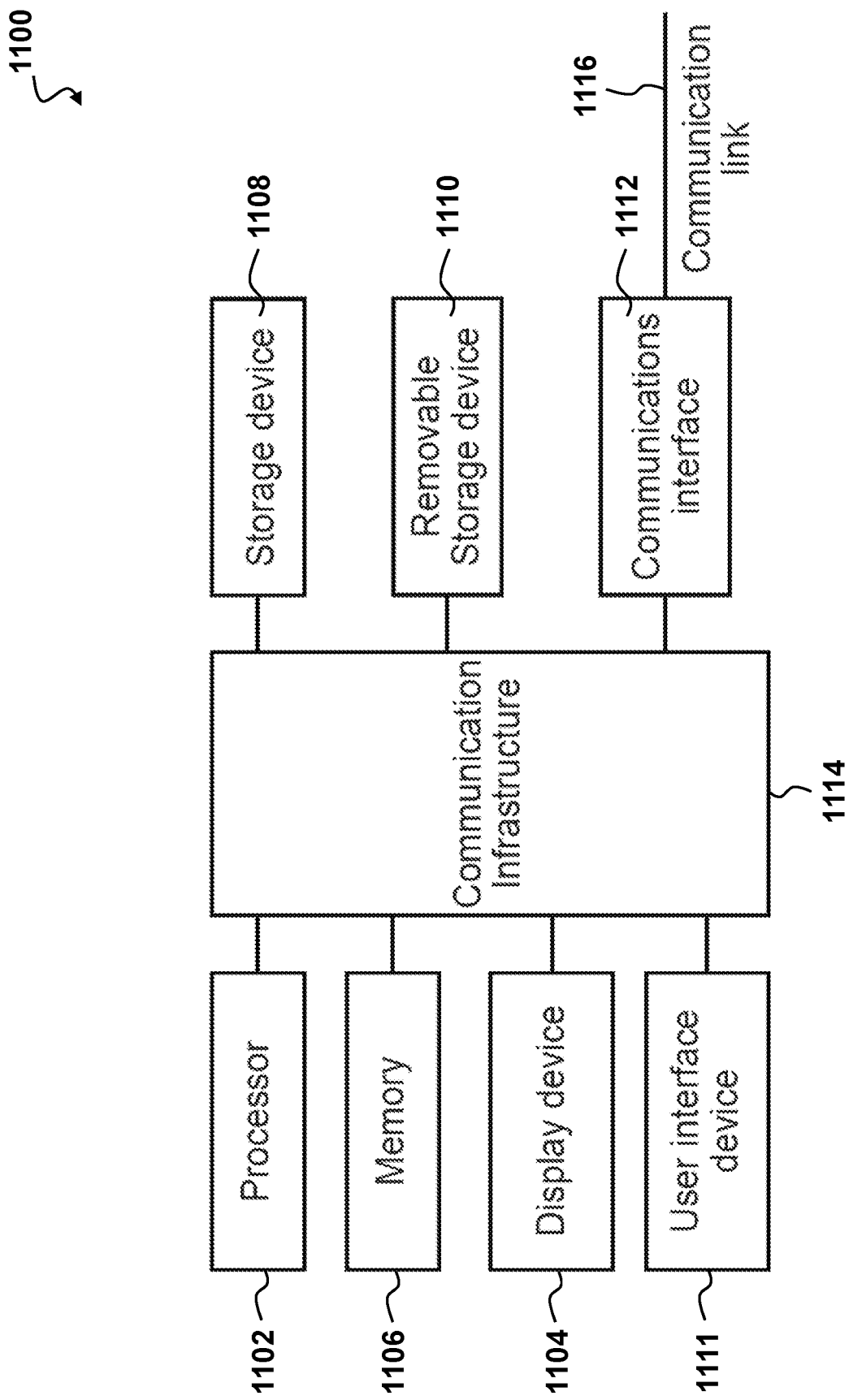
FIG. 9 shows a high-level block diagram and process of a computing system for implementing an embodiment of the system and process.

FIG. 9 is a high-level block diagram 1100 showing a computing system comprising a computer system useful for implementing an embodiment of the system and process, disclosed herein. Embodiments of the system may be implemented in different computing environments. The computer system includes one or more processors 1102, and can further include an electronic display device 1104 (e.g., for displaying graphics, text, and other data), a main memory 1106 (e.g., random access memory (RAM)), storage device 1108, a removable storage device 1110 (e.g., removable storage drive, a removable memory module, a magnetic tape drive, an optical disk drive, a computer readable medium having stored therein computer software and/or data), user interface device 1111 (e.g., keyboard, touch screen, keypad, pointing device), and a communication interface 1112 (e.g., modem, a network interface (such as an Ethernet card), a communications port, or a PCMCIA slot and card). The communication interface 1112 allows software and data to be transferred between the computer system and external devices. The system further includes a communications infrastructure 1114 (e.g., a communications bus, cross-over bar, or network) to which the aforementioned devices/modules are connected as shown.

Information transferred via communications interface 1114 may be in the form of signals such as electronic, electromagnetic, optical, or other signals capable of being received by communications interface 1114, via a communication link 1116 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1112. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 10:
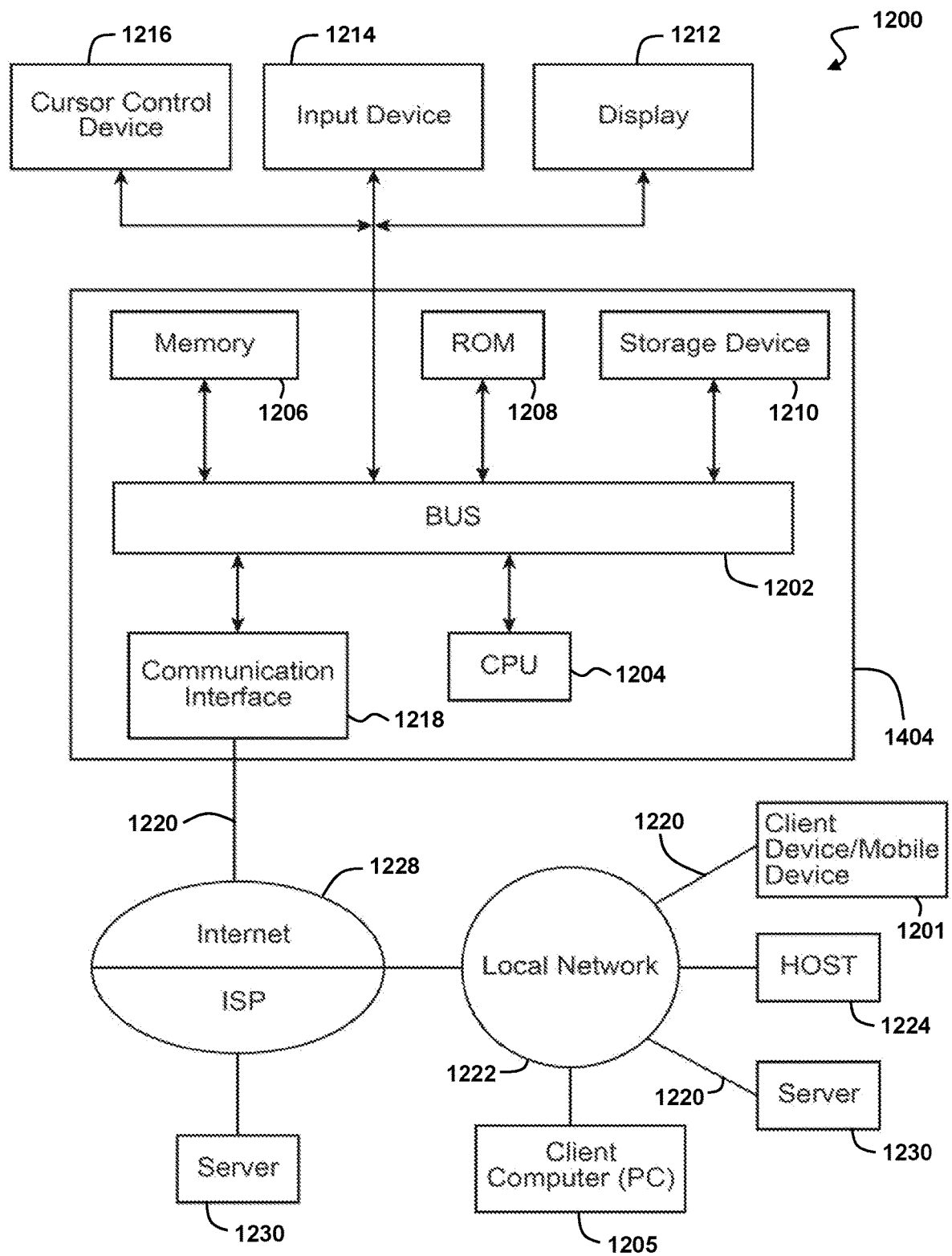
FIG. 10 shows a block diagram and process of an example of a system in which an embodiment may be implemented.

FIG. 10 shows a block diagram of an example system 1200 in which an embodiment may be implemented. The system 1200 includes one or more client devices 1201 such as consumer electronics devices, connected to one or more server computing systems 1230. A server 1230 includes a bus 1202 or other communication mechanism for communicating information, and a processor (CPU) 1204 coupled with the bus 1202 for processing information. The server 1230 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution or instructions to be executed by the processor 1204. The server computer system 1230 further includes a read only memory (ROM) 1208 or other static storage device coupled to the bus 1202 for storing static information and instructions for the processor 1204. A storage device 1210, such as a magnetic disk or optical disk, is provided and coupled to the bus 1202 for storing information and instructions. The bus 1202 may contain, for example, thirty-two address lines for addressing video memory or main memory 1206. The bus 1202 can also include, for example, a 32-bit data bus for transferring data between and among the components, such as the CPU 1204, the main memory 1206, video memory and the storage 1210. Alternatively, multiplex data/address lines may be used instead of separate data and address lines.

The server 1230 may be coupled via the bus 1202 to a display 1212 for displaying information to a computer user. An input device 1214, including alphanumeric and other keys, is coupled to the bus 1202 for communicating information and command selections to the processor 1204. Another type or user input device comprises cursor control 1216, such as a mouse, a trackball, or cursor direction keys for communicating direction information and command selections to the processor 1204 and for controlling cursor movement on the display 1212.

According to one embodiment, the functions are performed by the processor 1204 executing one or more sequences of one or more instructions contained in the main memory 1206. Such instructions may be read into the main memory 1206 from another computer-readable medium, such as the storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1204 for execution. Such a medium may take many forms, including but not limited to, non-volatile media, volatile media, and transmission media. Non-volatile media includes, for example, optical or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Various forms of computer readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the server 1230 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received from the main memory 1206 may optionally be stored on the storage device 1210 either before or after execution by the processor 1204.

The server 1230 also includes a communication interface 1218 coupled to the bus 1202. The communication interface 1218 provides a two-way data communication coupling to a network link 1220 that is connected to the world wide packet data communication network now commonly referred to as the Internet 1228. The Internet 1228 uses electrical, electromagnetic or optical signals that carry digital data streams. The signals through the various networks and the signals on the network link 1220 and through the communication interface 1218, which carry the digital data to and from the server 1230, are example forms or carrier waves transporting the information.

In another embodiment of the server 1230, interface 1218 is connected to a network 1222 via a communication link 1220. For example, the communication interface 1218 may be an integrated services digital network (ISDN) card or a modem to provide a data communication connection to a corresponding type of telephone line, which can comprise part of the network link 1220. As another example, the communication interface 1218 may be a local area network (LAN) card to provide a data communication connection to a compatible LAN. Wireless links may also be implemented. In any such implementation, the communication interface 1218 sends and receives electrical electromagnetic or optical signals that carry digital data streams representing various types of information.

The network link 1220 typically provides data communication through one or more networks to other data devices. For example, the network link 1220 may provide a connection through the local network 1222 to a host computer 1224 or to data equipment operated by an Internet Service Provider (ISP). The ISP in turn provides data communication services through the Internet 1228. The local network 1222 and the Internet 1228 both use electrical, electromagnetic or optical signals that carry digital data streams. The signals through the various networks and the signals on the network link 1220 and through the communication interface 1218, which carry the digital data to and from the server 1230, are examples forms or carrier waves transporting the information.

The server 1230 can send/receive messages and data, including e-mail, program code, through the network, the network link 1220 and the communication interface 1218. Further, the communication interface 1218 can comprise a USB/Tuner and the network link 1220 may be an antenna or cable for connecting the server 1230 to a cable provider, satellite provider or other terrestrial transmission system for receiving messages, data and program code from another source.

The example versions of the embodiments described herein may be implemented as logical operations in a distributed processing system such as the system 1200 including the servers 1230. The logical operations of the embodiments may be implemented as a sequence of steps executing in the server 1230, and as interconnected machine modules within the system 1200. The implementation is a matter of choice and can depend on performance of the system 1200 implementing the embodiments. As such, the logical operations constituting said example versions of the embodiments are referred to for e.g., as operations, steps or modules.

Similar to a server 1230 described above, a client device 1201 can include a processor, memory, storage device, display, input device and communication interface (e.g., e-mail interface) for connecting the client device to the Internet 1228, the ISP, or LAN 1222, for communication with the servers 1230. The system 1200 can further include computers (e.g., personal computers, computing nodes) 1205 operating in the same manner as client devices 1201, where a user can utilize one or more computers 1205 to manage data in the server 1230.

Figure 11:
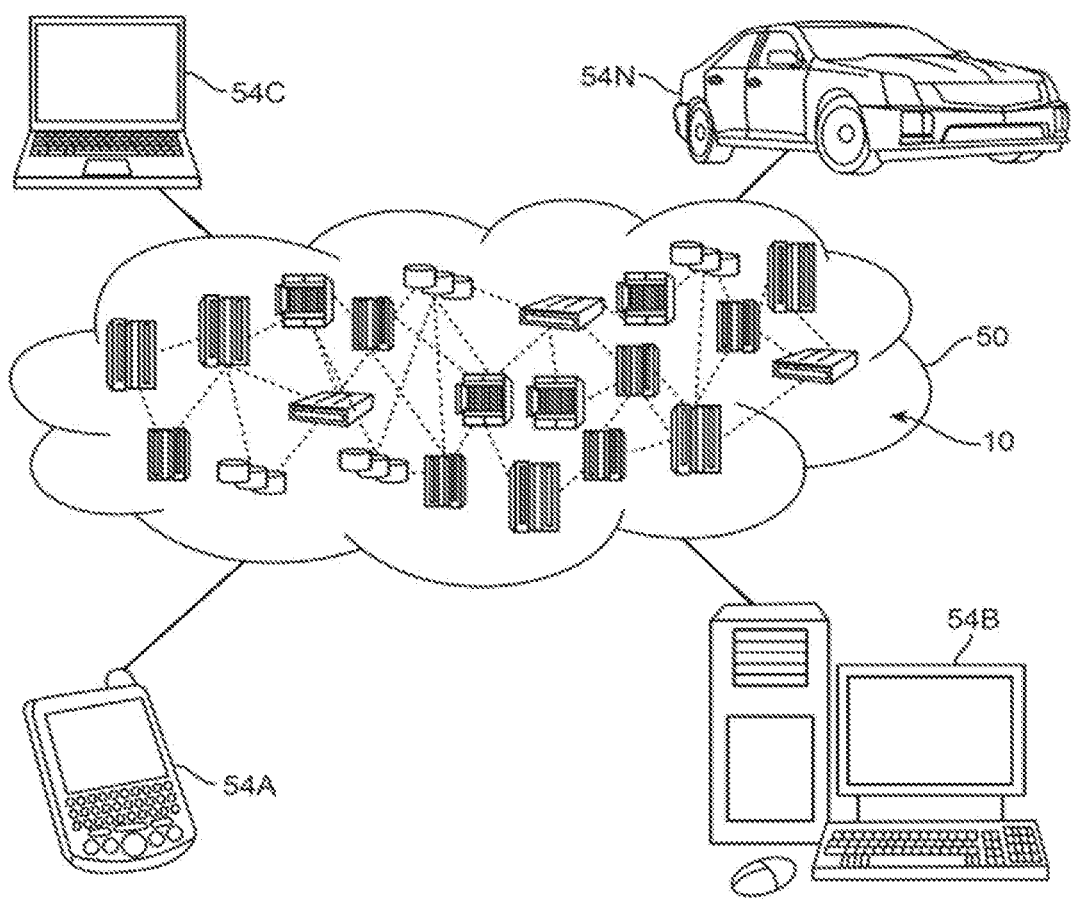
FIG. 11 depicts a cloud computing environment for implementing an embodiment of the system and process disclosed herein.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown are intended to be illustrative only and that computing nodes 10 and cloud computing environment 50 can communicate with any type of computerized device over any type of network and/or network addressable connection (e.g., using a web browser).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present inventions have been described in terms of preferred and alternative embodiments above, numerous modifications and/or additions to the above-described embodiments would be readily apparent to one skilled in the art. The embodiments may be defined as methods of use carried out by anyone, any subset of or all of the components and/or users; as systems of one or more components in a certain structural and/or functional relationship; and/or as subassemblies or sub-methods. The inventions can include each of the individual components separately. However, it is intended that the scope of the present inventions extend to all such modifications and/or additions and that the scopes of the present inventions are limited solely by the claims set forth herein. The inventions include the methods being included or distributed in CD-ROMs, DVDs, over the Internet, as a programmed computer, a processor and a non-transitory computer-readable medium, and others as would be apparent to those skilled in the art in view of this disclosure.

Although the terms first, second, third and so forth may be used herein to describe various members, elements, components, regions, layers and/or sections, these members, elements, components, regions, layers and/or sections should not be limited by these terms. These terms may be used to distinguish one element, component, region, layer or section from another region, layer or section. Terms such as "first," "second" and other numerical terms when used herein do not imply a sequence or order unless clearly indicated by the context. Thus, a first member, element, component, region, layer or section discussed below can be termed a second member, element, component, region, layer or section without departing from the aspects of the present teachings.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A method comprising:
receiving, by a server computing device, service provider data from a plurality of service provider devices, wherein the service provider data comprises information about an availability, category of service, and location of a service provider device among the plurality of service provider devices;
receiving, by the server computing device, a service request from a service requester device, the service requester device comprising at least one of: location, description, and digital media associated with the service request;
transmitting, by the server computing device, a subset of the plurality of service provider devices to the service requester in response to the service request, wherein the subset is determined by matching the service request with the received service provider data;
receiving from the service requester device, a selected service provider device from the transmitted subset of the plurality of service provider devices;
transmitting to the selected service provider device a notification of the selection by the service requester device;
receiving, by the server computing device, a response from the selected service provider device on whether the service request was accepted or rejected;
validating, by the server computing device, the received response that was accepted, wherein the accepted received response comprises a price amount determined by the service provider device and associated with the service request;
filtering the received response and associated price amount from the service providers devices by using the received service provider data and previously recorded price amounts;
receiving from the service requester device via the server computing device, a response as to whether a transmitted validated response and associated price amount are accepted or rejected; and
transmitting to the selected service provider device detailed information about the service request based on an accepted response from the service requester device of the validated response.

2. The method of claim 1, further comprising:
determining, by the server computing device, a category to associate with the service request, wherein the determining is via performing image recognition on the received digital media to determine objects present in the received digital media; and
associate the determined category to the service request based on successfully finding a set of recognized objects from the received digital media.

3. The method of claim 2, wherein the plurality of service provider devices of the server computing device provide continual transmission of GPS location as a way to determine whether the plurality of service provider devices are able to service an area within a specified radius.

4. The method of claim 2, wherein transmitting to the selected service provider device detailed information comprises transmitting an address to a location where a service is to be performed.

5. The method of claim 4, further comprising:
confirming, by the server computing device, that a service provider device is present at the address to the location where the service is to be performed by comparing the continual transmission of GPS location from the selected service provider device with the address.

6. The method of claim 5, further comprising:
determining whether a service request is competed based on a successful confirmation and receiving a signal from the selected service provider device that the service was done successfully.

7. The method of claim 6, further comprising:
providing an ability to submit a review of the service request based on a determination that the service request was completed successfully.

8. The method of claim 1, wherein at least one service bid comprises: availability to provide a service, a potential time of the service, a cost estimate of the service, and a current location.

9. The method of claim 1, wherein the subset is determined by matching the service request with the received service provider data and based on the selected service provider device being available and within a determined geographical location.

10. The method of claim 9, wherein the determined geographical location is determined based on a specified radius from a geolocation associated with the selected service provider device.

11. The method of claim 1, further comprising: establishing a direct communication channel between the service requester device and the selected service provider device based on the transmitted service provider detailed information.

* * * * *